US010931469B2

(12) United States Patent
Huang et al.

(10) Patent No.: US 10,931,469 B2
(45) Date of Patent: *Feb. 23, 2021

(54) METHODS AND APPARATUS FOR CELLULAR BROADCASTING AND COMMUNICATION SYSTEM

(71) Applicant: Neo Wireless LLC, Wayne, PA (US)

(72) Inventors: Haiming Huang, Bellevue, WA (US);
Xiaodong Li, Kirkland, WA (US);
Titus Lo, Bellevue, WA (US); Kemin Li, Bellevue, WA (US)

(73) Assignee: Neo Wireless LLC, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,319

(22) Filed: Jun. 11, 2020

(65) Prior Publication Data

US 2020/0304329 A1    Sep. 24, 2020

Related U.S. Application Data

(60) Continuation of application No. 16/055,873, filed on Aug. 6, 2018, which is a continuation of application
(Continued)

(51) Int. Cl.
*H04L 12/18*    (2006.01)
*H04N 21/2385*    (2011.01)
(Continued)

(52) U.S. Cl.
CPC ........ *H04L 12/1881* (2013.01); *H04L 5/0007* (2013.01); *H04L 5/14* (2013.01);
(Continued)

(58) Field of Classification Search
CPC ..... H04L 12/1881; H04L 5/0007; H04L 5/14; H04N 21/2385; H04N 21/26208;
(Continued)

(56) References Cited

U.S. PATENT DOCUMENTS 5,506,615 A * 4/1996 Awaji ................. H04N 7/17318
                                                    348/E7.071
5,659,545 A    8/1997 Sowles et al.
(Continued)

FOREIGN PATENT DOCUMENTS

CN    1332556    1/2002
CN    1571531    1/2005
CN    101197655    6/2008

OTHER PUBLICATIONS

Final Office Action for U.S. Appl. No. 11/571,468, dated Mar. 18, 2011, 24 pages.
(Continued)

*Primary Examiner* — Qun Shen
(74) *Attorney, Agent, or Firm* — Volpe Koenig

(57) ABSTRACT

A method performed by a mobile device in an OFDMA system may comprise receiving, in a first RF band, first scheduling information from a serving base station, the first scheduling information indicating an allocation of airlink resources in the first RF band. The method may further comprise receiving, in a second radio-frequency (RF) band, second scheduling information from the serving base station, the second scheduling information indicating an allocation of airlink resources in the second RF band. The method may further comprise receiving a first signal on the allocated airlink resources in the first RF band and a second signal on the allocated airlink resources in the second RF band during a common time period.

24 Claims, 13 Drawing Sheets

Related U.S. Application Data

No. 14/160,420, filed on Jan. 21, 2014, now Pat. No. 10,044,517, which is a division of application No. 13/605,784, filed on Sep. 6, 2012, now Pat. No. 8,634,375, which is a division of application No. 13/301,595, filed on Nov. 21, 2011, now Pat. No. 8,374,115, which is a division of application No. 11/571,468, filed as application No. PCT/US2006/011088 on Mar. 24, 2006, now Pat. No. 8,089,911.

(60) Provisional application No. 60/665,205, filed on Mar. 25, 2005, provisional application No. 60/665,184, filed on Mar. 25, 2005.

(51) Int. Cl.

| | | |
|---|---|---|
| *H04N 21/262* | (2011.01) | |
| *H04N 21/442* | (2011.01) | |
| *H04N 21/61* | (2011.01) | |
| *H04N 21/658* | (2011.01) | |
| *H04W 72/00* | (2009.01) | |
| *H04L 5/00* | (2006.01) | |
| *H04L 5/14* | (2006.01) | |
| *H04W 52/02* | (2009.01) | |
| *H04L 1/00* | (2006.01) | |
| *H04L 1/18* | (2006.01) | |
| *H04W 72/04* | (2009.01) | |
| *H04W 84/04* | (2009.01) | |
| *H04W 92/10* | (2009.01) | |

(52) U.S. Cl.
CPC ... *H04N 21/2385* (2013.01); *H04N 21/26208* (2013.01); *H04N 21/44209* (2013.01); *H04N 21/6131* (2013.01); *H04N 21/6582* (2013.01); *H04W 52/0216* (2013.01); *H04W 72/005* (2013.01); *H04L 1/0003* (2013.01); *H04L 1/0061* (2013.01); *H04L 1/18* (2013.01); *H04L 2001/0093* (2013.01); *H04W 72/04* (2013.01); *H04W 84/042* (2013.01); *H04W 92/10* (2013.01); *Y02D 30/70* (2020.08)

(58) Field of Classification Search
CPC ......... H04N 21/44209; H04N 21/6131; H04N 21/6582; H04W 52/0216; H04W 72/005; Y02D 30/70
See application file for complete search history.

(56) References Cited

U.S. PATENT DOCUMENTS

| | | | |
|---|---|---|---|
| 5,734,444 A | 3/1998 | Yoshinobu | |
| 5,794,116 A | 8/1998 | Matsuda et al. | |
| 5,878,324 A | 3/1999 | Borth et al. | |
| 6,201,970 B1 | 3/2001 | Suzuki et al. | |
| 6,256,509 B1 | 7/2001 | Tanaka et al. | |
| 6,292,474 B1* | 9/2001 | Ali | H04B 1/0064 370/328 |
| 6,370,153 B1 | 4/2002 | Eng | |
| 6,529,146 B1 | 3/2003 | Kowalski et al. | |
| 6,701,528 B1 | 3/2004 | Arsenault et al. | |
| 6,788,959 B2 | 9/2004 | Jokinen et al. | |
| 6,950,624 B2 | 9/2005 | Kim et al. | |
| 6,965,580 B1 | 11/2005 | Takagi et al. | |
| 7,050,511 B2 | 5/2006 | Jeong et al. | |
| 7,085,576 B2 | 8/2006 | Ranganathan | |
| 7,184,726 B2 | 2/2007 | Shibata | |
| 7,197,025 B2 | 3/2007 | Chuah | |
| 7,200,124 B2* | 4/2007 | Kim | H04W 36/0094 370/280 |
| 7,203,158 B2 | 4/2007 | Oshima et al. | |
| 7,324,832 B2 | 1/2008 | van Rooyen | |
| 7,336,646 B2 | 2/2008 | Muller | |
| 7,339,882 B2 | 3/2008 | Schaefer et al. | |
| 7,352,722 B2* | 4/2008 | Malladi | H04L 1/0015 370/329 |
| 7,406,104 B2 | 7/2008 | Yang et al. | |
| 7,428,385 B2 | 9/2008 | Lee et al. | |
| 7,500,261 B1 | 3/2009 | Myers | |
| 7,548,506 B2 | 6/2009 | Ma et al. | |
| 7,680,094 B2 | 3/2010 | Liu | |
| 7,734,762 B2 | 6/2010 | Hundscheidt et al. | |
| 7,801,490 B1 | 9/2010 | Scherzer | |
| 7,961,609 B2 | 6/2011 | Teague et al. | |
| 8,014,264 B2 | 9/2011 | Li et al. | |
| 8,046,801 B2 | 10/2011 | Ellis et al. | |
| 8,089,911 B2 | 1/2012 | Huang et al. | |
| 8,374,115 B2 | 2/2013 | Huang et al. | |
| 8,634,375 B2 | 1/2014 | Huang et al. | |
| 2002/0080887 A1 | 6/2002 | Jeong et al. | |
| 2002/0126780 A1 | 9/2002 | Oshima et al. | |
| 2002/0150387 A1 | 10/2002 | Kunii et al. | |
| 2002/0163695 A1 | 11/2002 | Unitt et al. | |
| 2003/0045254 A1 | 3/2003 | Shibata | |
| 2003/0072255 A1* | 4/2003 | Ma | H04L 5/0023 370/208 |
| 2003/0125025 A1 | 7/2003 | Lim | |
| 2003/0152094 A1 | 8/2003 | Colavito et al. | |
| 2003/0207696 A1 | 11/2003 | Willenegger et al. | |
| 2003/0214928 A1* | 11/2003 | Chuah | H04L 47/30 370/336 |
| 2004/0001429 A1 | 1/2004 | Ma et al. | |
| 2004/0062222 A1 | 4/2004 | Seidel et al. | |
| 2004/0184471 A1 | 9/2004 | Chuah et al. | |
| 2004/0192342 A1 | 9/2004 | Ranganathan | |
| 2005/0028208 A1 | 2/2005 | Ellis et al. | |
| 2005/0055723 A1* | 3/2005 | Atad | H04N 21/6175 725/80 |
| 2005/0068990 A1* | 3/2005 | Liu | H04J 3/0682 370/516 |
| 2005/0108763 A1* | 5/2005 | Baran | H04N 21/2362 725/87 |
| 2005/0135416 A1 | 6/2005 | Ketchum et al. | |
| 2005/0141475 A1 | 6/2005 | Vijayan et al. | |
| 2005/0152697 A1 | 7/2005 | Lee et al. | |
| 2005/0174964 A1 | 8/2005 | Orlik et al. | |
| 2005/0175070 A1 | 8/2005 | Grob et al. | |
| 2005/0193309 A1* | 9/2005 | Grilli | H03M 13/2707 714/752 |
| 2005/0195823 A1 | 9/2005 | Chen et al. | |
| 2005/0204388 A1 | 9/2005 | Knudson et al. | |
| 2005/0254427 A1 | 11/2005 | Leon et al. | |
| 2006/0007930 A1 | 1/2006 | Dorenbosch | |
| 2006/0018347 A1 | 1/2006 | Agrawal | |
| 2006/0019677 A1 | 1/2006 | Teague et al. | |
| 2006/0069799 A1 | 3/2006 | Hundscheidt et al. | |
| 2006/0088023 A1 | 4/2006 | Muller | |
| 2006/0098567 A1 | 5/2006 | Willenegger et al. | |
| 2006/0128428 A1 | 6/2006 | Rooyen | |
| 2006/0146745 A1* | 7/2006 | Cai | H04L 29/06027 370/328 |
| 2006/0146822 A1 | 7/2006 | Kolakowski et al. | |
| 2006/0176966 A1 | 8/2006 | Stewart et al. | |
| 2006/0251045 A1 | 11/2006 | Okubo | |
| 2007/0058595 A1 | 3/2007 | Classon et al. | |
| 2007/0064588 A1 | 3/2007 | Kisoda et al. | |
| 2007/0081538 A1 | 4/2007 | Ganji | |
| 2011/0002311 A1 | 1/2011 | Wang et al. | |
| 2012/0176952 A1 | 7/2012 | Huang et al. | |
| 2013/0121232 A1 | 5/2013 | Huang et al. | |

OTHER PUBLICATIONS

International Search Report and Written Opinion for International Application No. PCT/US06/11088, filed Mar. 24, 2006, Application Neocific, Inc., dated Jul. 28, 2006, 9 pages.

International Search Report and Written Opinion for International Application No. PCT/US06/22376, Filed Jun. 6, 2006, Applicant: Neocific, Inc., dated Mar. 27, 2007, 8 pages.

(56) References Cited

OTHER PUBLICATIONS

Non-Final Office Action for U.S. Appl. No. 11/571,468, dated Jun. 24, 210, 19 pages.
Non-Final Office Action for U.S. Appl. No. 13/605,784, dated Mar. 4, 2013, 14 pages.
Notice of Allowance for U.S. Appl. No. 11/571,468, dated Nov. 15, 2011, 15 pages.
Notice of Allowance for U.S. Appl. No. 13/301,595, dated Dec. 28, 2012, 13 pages.

\* cited by examiner

METHODS AND APPARATUS FOR CELLULAR BROADCASTING AND COMMUNICATION SYSTEM

CROSS-REFERENCE TO RELATED APPLICATION(S)

This application is continuation of, and incorporates by reference in its entirety, U.S. patent application Ser. No. 16/055,873, filed Aug. 6, 2018, which is a continuation of U.S. patent application Ser. No. 14/160,420, now U.S. Pat. No. 10,044,517, file Jan. 21, 2014, which is a divisional of U.S. patent application Ser. No. 13/605,784, now U.S. Pat. No. 8,634,375, filed Sep. 6, 2012, which is a divisional of U.S. patent application Ser. No. 13/301,595, now U.S. Pat. No. 8,374,115, filed Nov. 21, 2011, which is a divisional of U.S. patent application Ser. No. 11/571,468, now U.S. Pat. No. 8,089,911, having a 371 date of Nov. 28, 2007, which is a National Phase Application of PCT/US06/11088, filed Mar. 24, 2006, which claims the benefit of U.S. Provisional Patent Applications No. 60/665,184 and 60/665,205, filed on Mar. 25, 2005.

TECHNICAL FIELD

The disclosed embodiments relate, in general, to wireless communication and include methods and apparatus for signal broadcasting which is augmented by individual signals.

SUMMARY

A method performed by a mobile device in an orthogonal frequency division multiple access (OFDMA) system may comprise receiving, in a first radio-frequency (RF) band, first scheduling information from a serving base station, the first scheduling information indicating an allocation of airlink resources in the first RF band, wherein the first RF band spans a first plurality of subchannels. The method may further comprise receiving, in a second radio-frequency (RF) band, second scheduling information from the serving base station, the second scheduling information indicating an allocation of airlink resources in the second RF band, wherein the second RF band spans a second plurality of subchannels, wherein the first RF band and second RF band are different RF bands. The method may further comprise receiving a first signal on the allocated airlink resources in the first RF band and a second signal on the allocated airlink resources in the second RF band during a common time period. Each of the first signal and second signal may carry data. A same type of frame structure, spanning a plurality of subframes, may be used for receiving the first signal and the second signal.

BACKGROUND

The evolution of wireless systems has followed two different paths: radio and television broadcasting. Wireless communication started with paging and dispatch systems. Wireless voice communication became a booming industry in the past two decades. The last five years has witnessed many wireless data communication systems such as wireless local area network (WLAN) and broadband wireless access (BWA) systems. With digitalization and the advancements of the digital communication technology, digital broadcasting has become a new trend with digital video broadcast (DVB) and digital audio broadcast (DAB) systems as examples.

Recently, there is a trend of merging wireless technologies to provide support to multimedia applications in integrated environments. The third generation (3G) wireless communication systems have already integrated voice and data services. The recent WiMax technology is focused on a single platform to support broadband application with quality of service (QoS).

Naturally, the integration of the broadcast and the communication systems is the next step in the evolution of the wireless systems, but involves many challenges. For example, the broadcast system needs to deal with broadcast channels that have different characteristics. Also, the scheduler needs to optimally work with two downlink transmission paths: the broadcast channel and the regular (individual) channel. However, integration of a broadcast system with a communication system without sharing certain control information is not an optimized solution.

In a broadcasting system, content data from the source is delivered to multiple transmission base stations, which broadcast to receivers using a particular transmission method such as Orthogonal Frequency Division Modulation (OFDM). To alleviate the problem of interference from different base stations, the broadcasting data is simultaneously transmitted by all the base stations using same time/frequency resource. This type of network configuration is commonly known as the single frequency network (SFN), which has been used in applications such as the digital video broadcasting (DVB) system.

In the case of the DVB, the broadcasting video data, which is in the format of Moving Picture Experts Group 2 (MPEG-2) transport streams, is coded into a mega-frame format and is distributed to the base stations with a time stamp in the synchronized bit stream. The base stations are all synchronized to a common time source and use the time stamp to synchronize exact transmission time of the broadcast data. However, recently more and more new wireless data network infrastructures use packet data networks as their backbone. A packet data network has a bursty packet arrival pattern, random receiving packet order and multiple distribution paths, which is significantly different from those of the MPEG-2 transport streams. Therefore, the DVB approach is not suitable for a packet data network and for a SFN video broadcasting that uses a packet data network backbone.

DETAILED DESCRIPTION

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

The disclosed embodiments of this invention present methods and apparatus for cellular broadcasting and communication systems. The multiple access technology mentioned herein can be of any special format such as Code Division Multiple Access (CDMA), Time Division Multiple Access (TDMA), Frequency Division Multiple Access (FDMA), Orthogonal Frequency Division Multiple Access (OFDMA), or Multi-Carrier Code Division Multiple Access (MC-CDMA).

Without loss of generality, OFDMA is employed herein as an example to illustrate different aspects of these embodiments. The cellular broadcasting and communication system can operate with both the time division duplexing (TDD) and frequency division duplexing (FDD).

In a wireless network, there are a number of base stations, each of which provides coverage to its designated area, normally called a cell. If a cell is divided in to sectors, from system engineering point of view each sector can be considered as a cell. In this context, the terms "cell" and "sector" are interchangeable.

Figure 1:
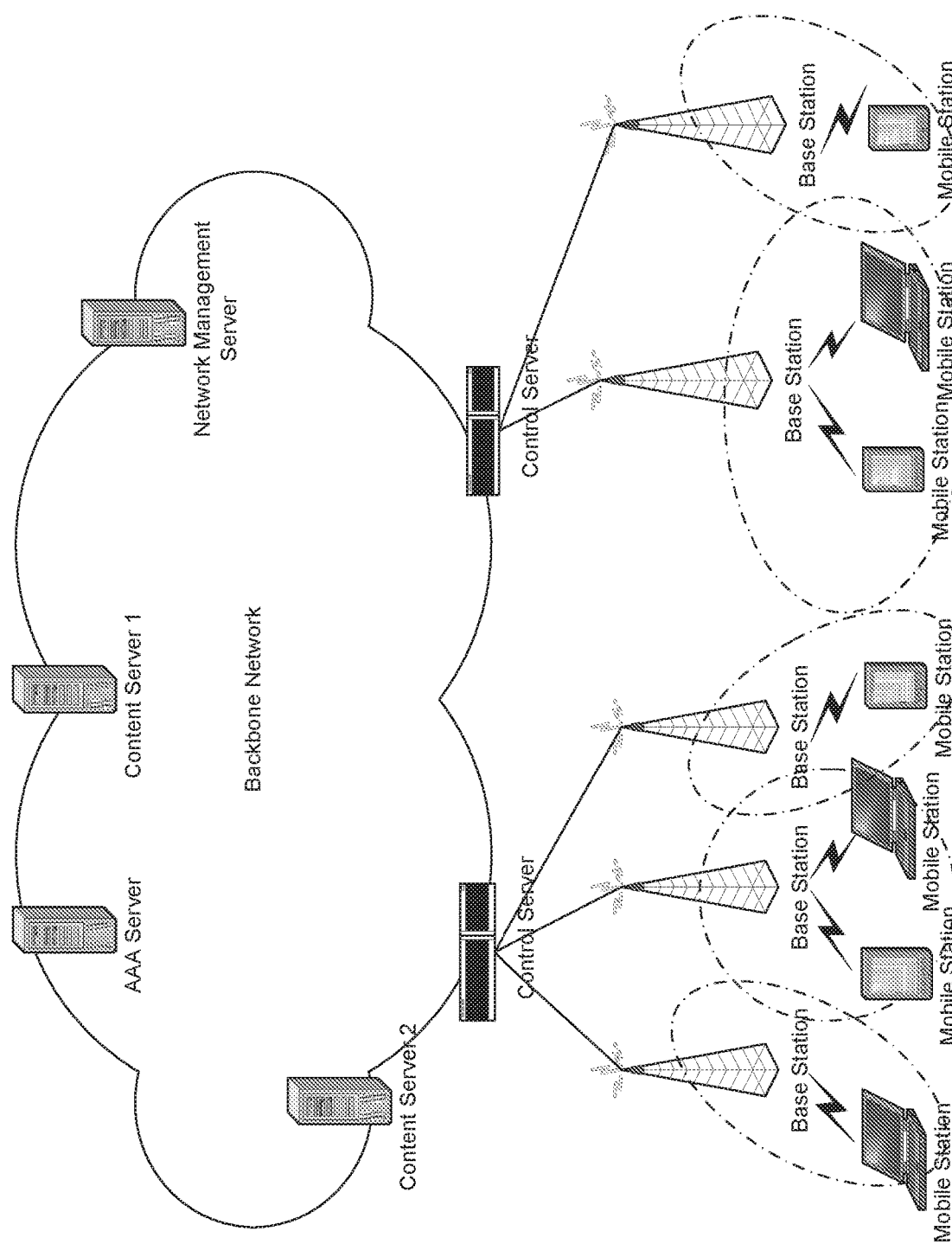
FIG. 1 illustrates system architecture of a cellular wireless system.

A base station serves as a focal point for distributing information to and collecting information from its mobile stations by radio signals. The mobile station is the communication interface between the user and the wireless network. The transmission from a base station to a mobile station is called a "downlink" and the transmission from a mobile station to a base station is called an "uplink." The terms "user" and "receiver" have been used interchangeably. The term "mobile station" represents the user terminal in a fixed wireless system or a portable device with the wireless communication interface. FIG. 1 shows the system architecture of a cellular system.

There is at least one control server (CS) in a multi-cell wireless network, which controls one or multiple base stations (BS). The control server is connected to the base stations via the backbone network. The backbone network can be either wired network or wireless network. It can also be either a circuit switched network or a packet data network. The backbone network may also connect to other servers in the system, such as a number of authentication/ authorization/accounting (AAA) servers, content servers, and network management servers.

A "Cellular Broadcasting and Communication System" is a special type of cellular wireless system. In the following description, the term "Cellular System" is used as an abbreviation of the "Cellular Broadcasting and Communication System." The Cellular System employs at least three radio channels, as described below:

1. Downlink Broadcast Channel, which carries the broadcast data signal to all the mobile stations. For each cell, the broadcast signal can be transmitted independently or in a coordinated manner, using technologies such as SFN (same frequency network).
2. Downlink Regular Channel, which carries the signal designated to a specific mobile station in a cell. Antenna beam forming and multicast technologies can be used to enhance the transmission on downlink regular channels.
3. Uplink Channel, which can be used to send feedback information that may include receiver requests, the ACK/NACK for each downlink data packet, and/or the downlink signal quality information of each individual mobile station.

In many multimedia applications, the application data is encoded into multiple application bit streams by the content server, using source coding schemes. The disclosed embodiments also define a system component called IMA (Intelligent Scheduling Agent) in the transmitter of a base station, which maps multiple application streams into the underlying wireless channels based on the system control information and the feedback from the receivers.

The base station transmits broadcasting data to mobile stations via the downlink broadcast channel or the downlink regular channel. The choice of scheduling method for a particular bit stream and for a specific radio channel directly impacts the system behavior, such as the system capacity and performance. This is because the two types of downlink channels have different characteristics. Special arrangements can be made for a group of individual mobile stations to improve the overall coverage. Furthermore, based on the feedback information transmitted by individual mobile stations through the uplink channel, augment signals can be sent to selected individual mobile stations if their received signals need improvement.

Cellular Broadcasting and Communication System

For each cell, the (downlink) broadcast signal can be transmitted independently or in coordination. In one embodiment, multiple base stations are coordinated to transmit the same broadcast signal simultaneously using single frequency network (SFN) technology. The modulation and coding scheme (MCS) of the downlink broadcast channel is usually affected by general statistics of the wireless system, possibly obtained through pre-deployment site survey or cellular network planning.

The downlink regular channel, which is usually defined for a single cell, carries signals that are designated to one mobile station. Typically, for each mobile station the regular channel signal content and/or format is different. The data content also includes downlink data and control information such as digital rights management messages. The MCS of the downlink regular channel is determined by individual user's downlink signal quality, which is obtained from the user feedback. Antenna beam forming can enhance the signal quality of the downlink regular channel. Data transmission to multiple mobile stations in the downlink regular channel may also be combined to use multicast schemes.

The mobile stations use the uplink channel to transmit uplink data to the base station, which includes both data and control information such as digital rights management messages. The uplink channel can also be used to send feedback information that may include:

1. Receiver Request, wherein a receiver can specify its preference, or request something via the uplink channel. The request, for example, can be a command entered by a user to switch to another TV program or to order a high definition TV program.
2. A Receiver Feedback, wherein the feedback may indicate downlink channel receiving quality. In one embodiment, the Signal to Noise Ratio (SNR) of the downlink channel is reported in the uplink channel. The receiver feedback information may be packet based, such as automatic repeat request (ARQ) feedback.

Figure 2:
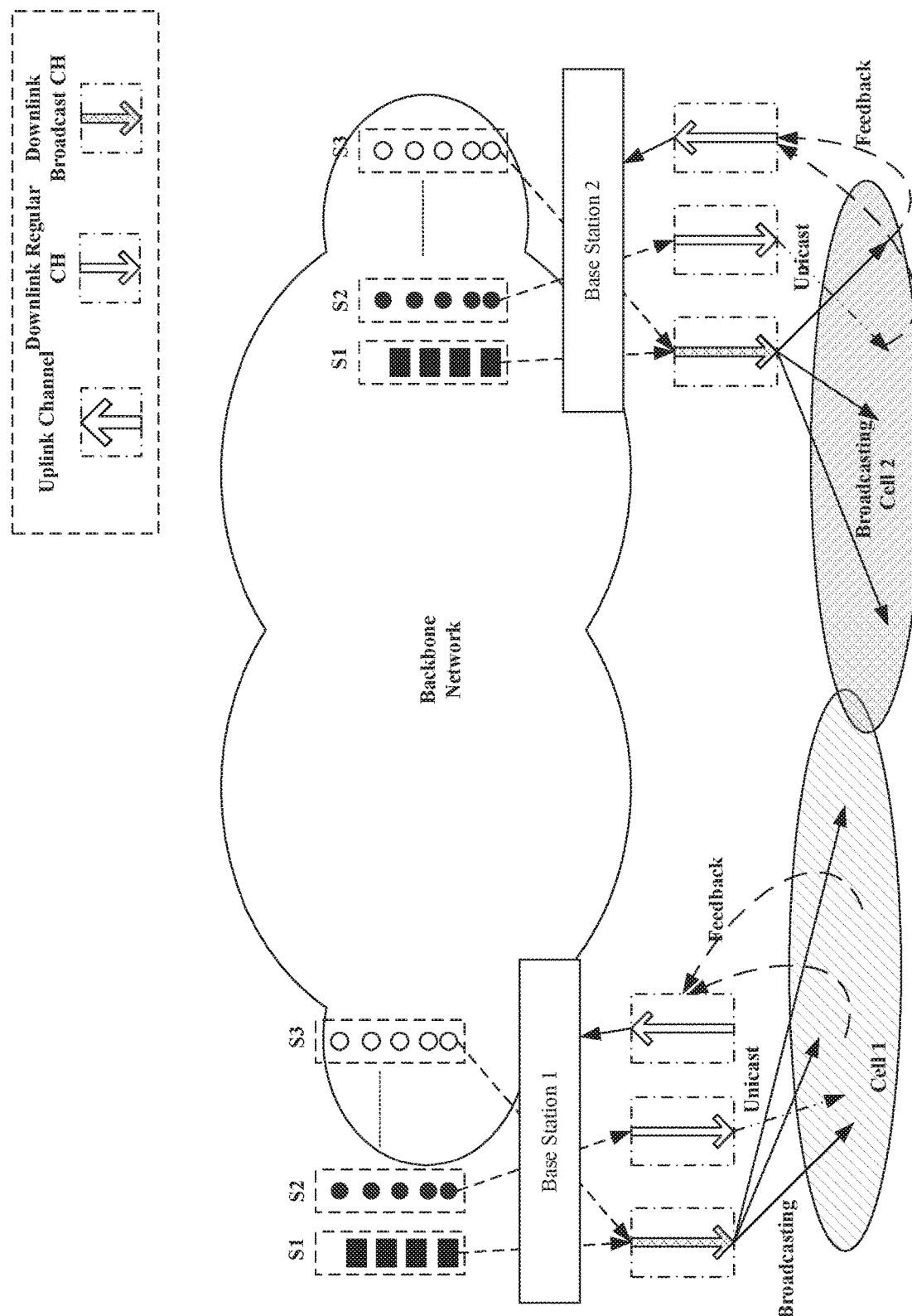
FIG. 2 illustrates a cellular system with a base station that broadcasts data to mobile stations using either a downlink broadcast channel or a downlink regular channel.

In a Cellular System, as illustrated in FIG. 2, the base station transmits broadcasting data to mobile stations through either the downlink broadcast channel or the downlink regular channel. The system augments the broadcast signals to those individual users that feed back an unacceptable quality of downlink signals. The system augments are prepared based on the feedback information transmitted by the individual mobile station through the uplink channel.

The following embodiments are examples of Cellular Systems using different frame structure and transmission schemes.

In some embodiments an adaptable frame structure (AFS) system is employed wherein a transmission frame comprises multiple subframes, each containing a downlink transmission period and an uplink transmission period. A downlink broadcasting signal is used to indicate to the receivers the configuration of each subframe.

Figure 3:
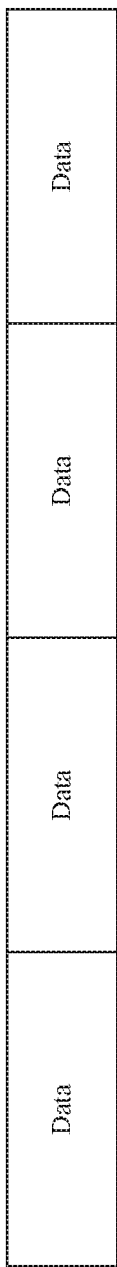
FIG. 3 illustrates an adaptable frame structure (AFS) in a TDD system, wherein each subframe in a TDD frame can be designed to fit a special application.
Figure 3:
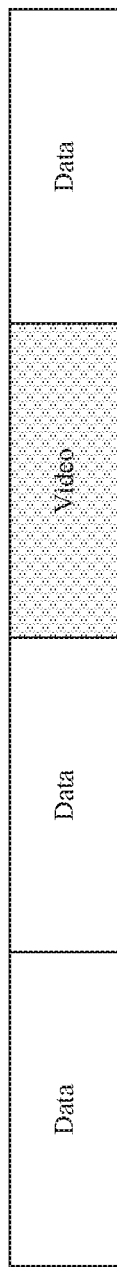
Figure 3:
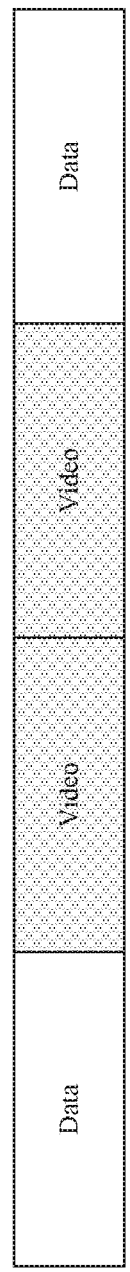
Figure 3:
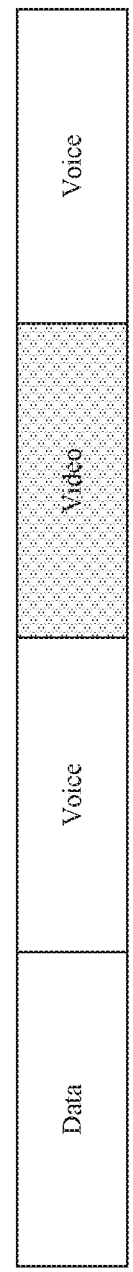

The downlink and uplink period configuration in each subframe can be independently adapted to support applications with a variety of traffic patterns, from symmetric to highly asymmetric. A frame is divided into multiple subframes with flexible mix of subframe types. Therefore, a great variety of applications such as normal two-way data communications, voice communications, video, and data broadcasting are efficiently supported in a single frequency band. Using multiple frequency bands increases capacity or adds more flexibility. As shown in the embodiment of FIG. 3, each subframe in a TDD frame is designed to fit a special application, such as voice, data, or video.

In one embodiment, a cellular system uses AFS, the frame of which has two different types of subframes: the video and the data subframes. The video subframe is used as the downlink broadcast channel. The data subframe includes a downlink period that is used as downlink regular channel, and an uplink period that is used for transmitting uplink feedback information.

In another embodiment, the video subframe of the AFS system uses SFN to simultaneously broadcast the same radio signal from the base stations.

Figure 4:
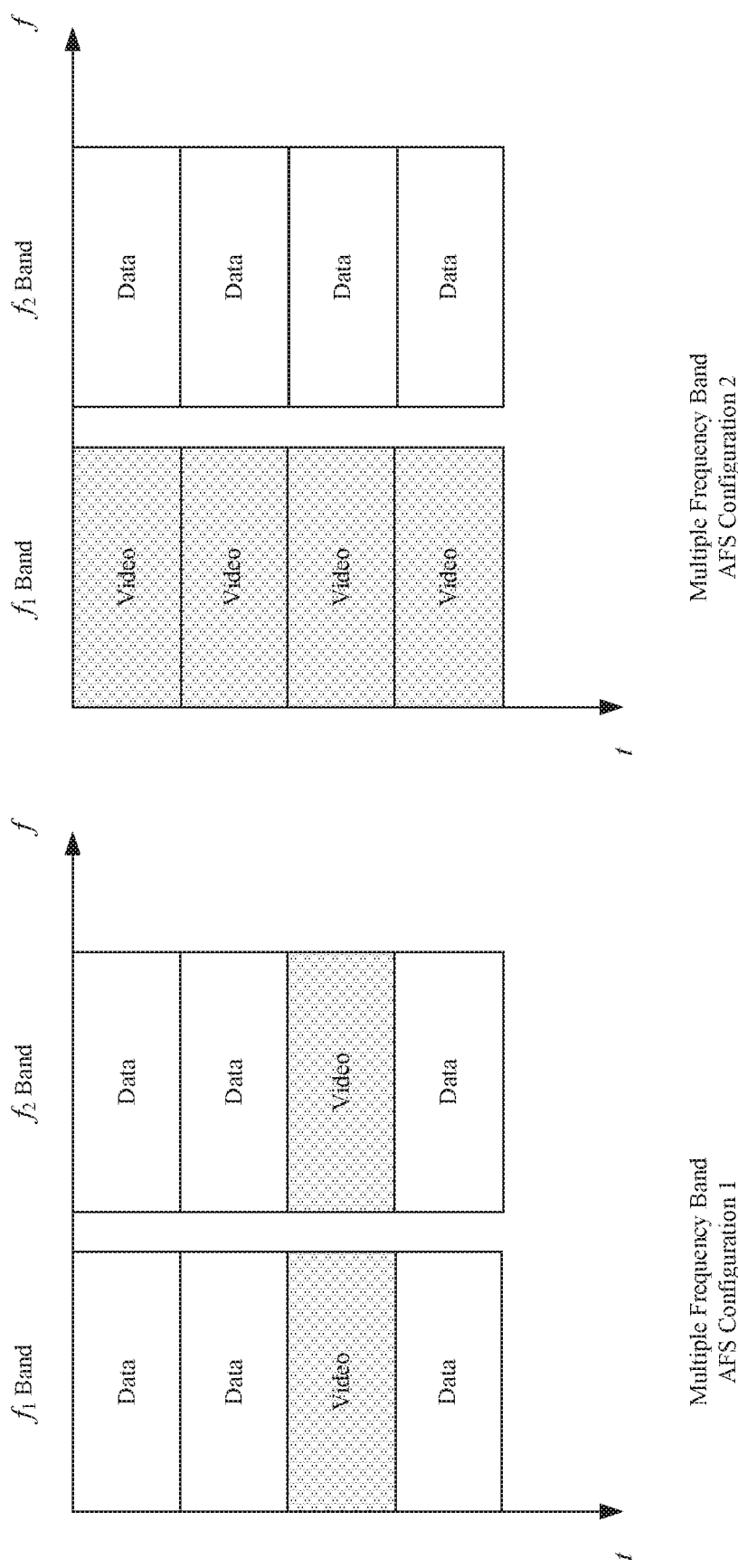
FIG. 4 illustrates two examples of channel scheduling for an AFS system, using multiple frequency bands.

In yet another embodiment, there are multiple frequency bands in an AFS Cellular System. Without loss of generality, FIG. 4 shows a system with two frequency bands $f_1$ and $f_2$. Based on the system configuration, the AFS video and data subframes can use both bands. In one embodiment each frequency band is used by the two downlink and the one uplink channels and in another embodiment one frequency band is exclusively used by the downlink broadcast channel and the other is used by the downlink regular channel and the uplink channel. The downlink broadcast channel is defined as the video subframe in both frequency bands.

Figure 5:
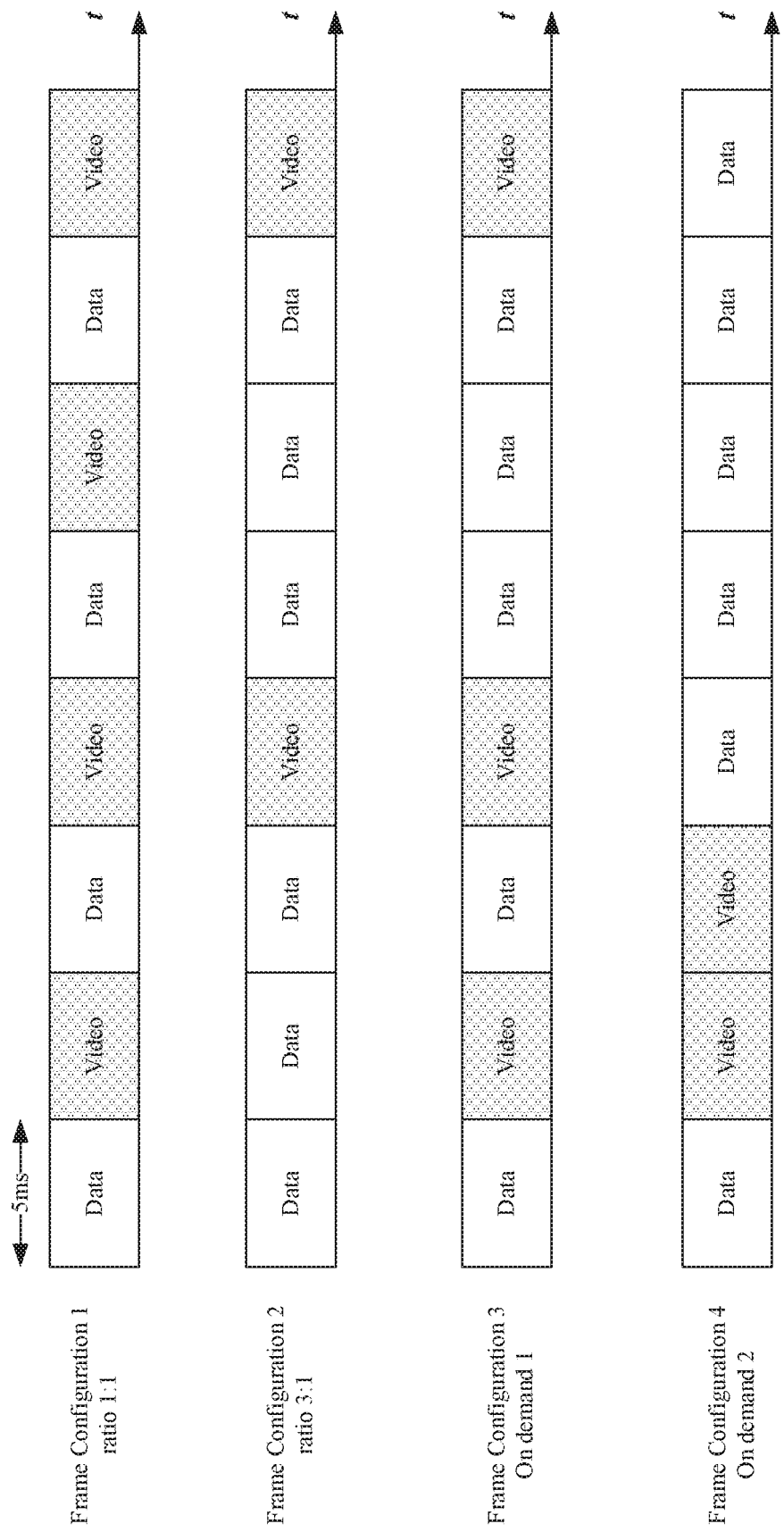
FIG. 5 illustrates another example of a system frame structure configuration that has two types of 5 ms frames: a video frame and a data frame.

With a more generic definition for adaptive frame structure, a Cellular System can have two types of 5 ms frames: the video frame and the data frame. As shown in FIG. 5, these two types of frames are interleaved. The mixing ratio of the frame types is defined either by the system configuration or by the incoming data pattern. The uplink period of a data frame is used as the uplink channel, the downlink period of the data frame is used as the downlink regular channel, and the video frame is used as the downlink broadcast channel.

Frame configuration 4 in FIG. 5 illustrates a special design to reduce power consumption of those mobile terminals which only receive video broadcast data. The mobile terminal only wakes up periodically at the video frame when its video burst is broadcasted. It buffers the video content up to its burst buffer limit and goes into power saving mode afterwards. With the buffered video data, it can play back video stream continuously. The mobile terminal remains in the power saving mode until the next video burst arrives.

Multiple Application Bit Streams

In many multimedia applications, using a source coding scheme, the application data is encoded by the content server into multiple application bit streams. In the presented embodiments, these streams are identified by S1, S2, . . . , Sn, where n≥1.

In one embodiment, a digital TV program is encoded and compressed into three bit streams; namely, an audio stream, a basic video stream containing low resolution video information, and a complementary video stream that carries differential information for a receiver to reproduce, together with the basic bit stream, high-resolution images of the same video content.

In another embodiment, the broadcast data is encoded into two bit streams for reliable transmission. The original bit stream is broadcasted in sequence. If a receiver fails to receive the original data, it can request retransmission bit stream which contains those lost packets.

In yet another embodiment, high definition television (HDTV) broadcast data is encoded into three streams using hierarchical source code. S1 contains a basic video stream for low resolution receivers in mobile devices such as cell phones and personal data assistants (PDA). S2 is a complementary video stream that carries the differential information for a receiver to replay the same program with standard definition television (SDTV) quality. And S3 carries the differentiation information between SDTV and HDTV.

The bit streams generated by the content server may be forwarded to the base stations directly or relayed to the base stations via their control server. The bit streams may also be modified by the control server to add control information. The control information will be removed when transmitted from the base stations to the mobile stations.

In one embodiment for SFN based broadcast, the original streams S1, S2, . . . , Sn, are first transmitted to the control servers. The control servers insert time synchronization information tags and attach them to the streams. The modified streams S1', S2', . . . , Sn' are transmitted to the base stations via the backbone network. The base stations use the tag to synchronize their transmission time. The attached tags are removed from the streams when they are broadcasted to the mobile stations.

Intelligent Scheduling Agent

The multiple bit streams are mapped into the underlying two downlink radio channels in a Cellular System by a system component called an "Intelligent Scheduling Agent"

Figure 6:
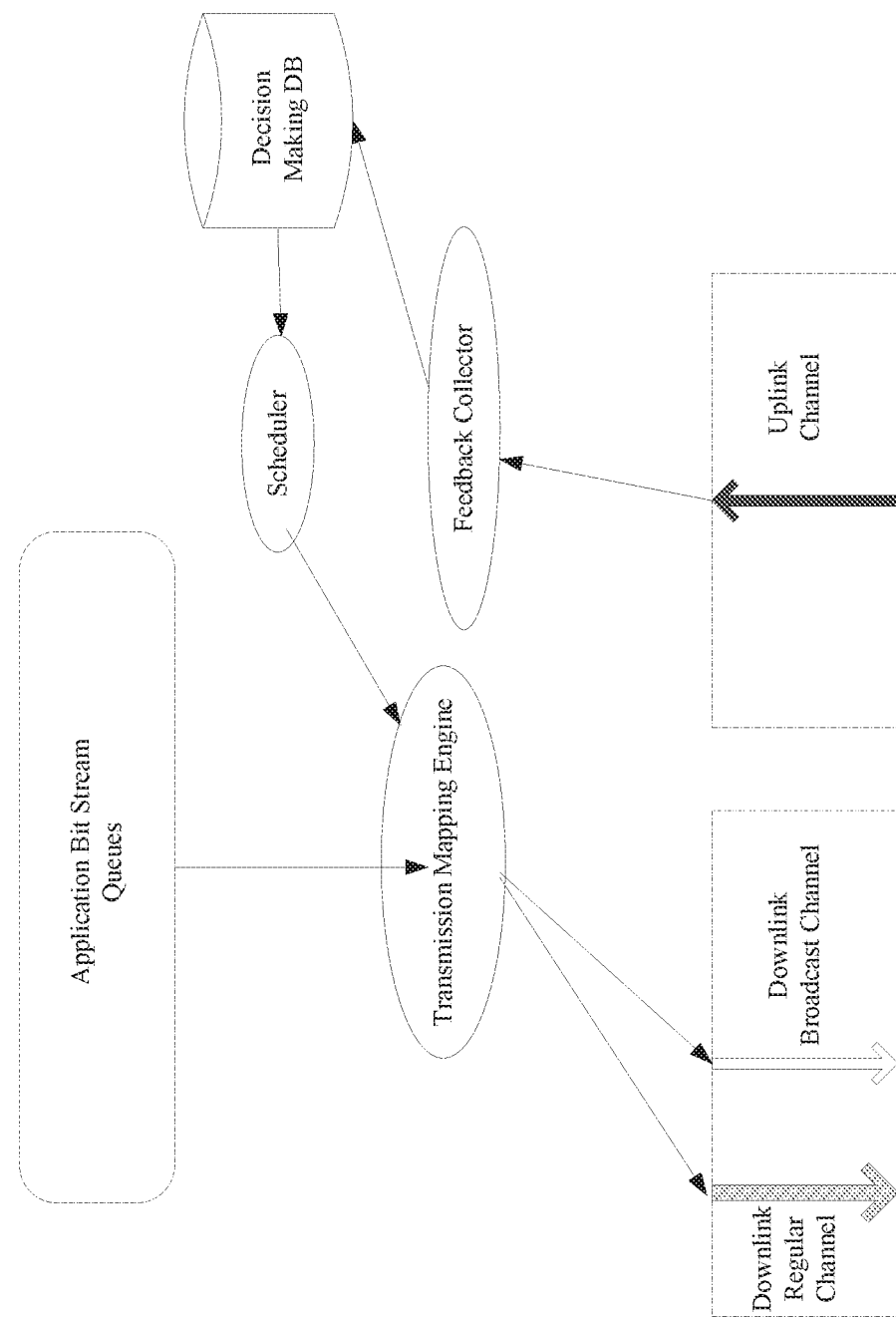
FIG. 6 illustrates system architecture of an Intelligent Scheduling Agent (IMA).

(IMA). FIG. 6 illustrates the system architecture of an IMA. In one embodiment, there are five system components in an IMA: (1) Transmission Mapping Engine, (2) Application Bit Stream Queues, (3) Scheduler, (4) Decision Making Database, and (5) Feedback Collector. The IMA components can be implemented as distributed software processes. In a Cellular System, the IMA system components can either reside in the control server or be integrated with the base station.

The input application bit streams are first stored in the Application Bit Stream Queues. A scheduling data or decision is made by the Scheduler, which consults with the Decision Making Database for system control information, and generates scheduling decisions based on system objectives. The Transmission Mapping Engine multiplexes the bit streams into different channels based on the scheduling decisions. The Feedback Collector forwards receiver feedback to the Decision Making Database, which will be used by a scheduling algorithm of the Scheduler.

In one embodiment, the Application Bit Stream Queues, Scheduler, and Decision Making Database are implemented in the control server and the Transmission Mapping Engine and the Feedback Collector are implemented in the base station. The scheduling decision is forwarded to the Transmission Mapping Engine together with the application data stream. The Feedback Collector reports the user feedback information back to the central control server, where the Decision Making Database is updated.

Figure 7:
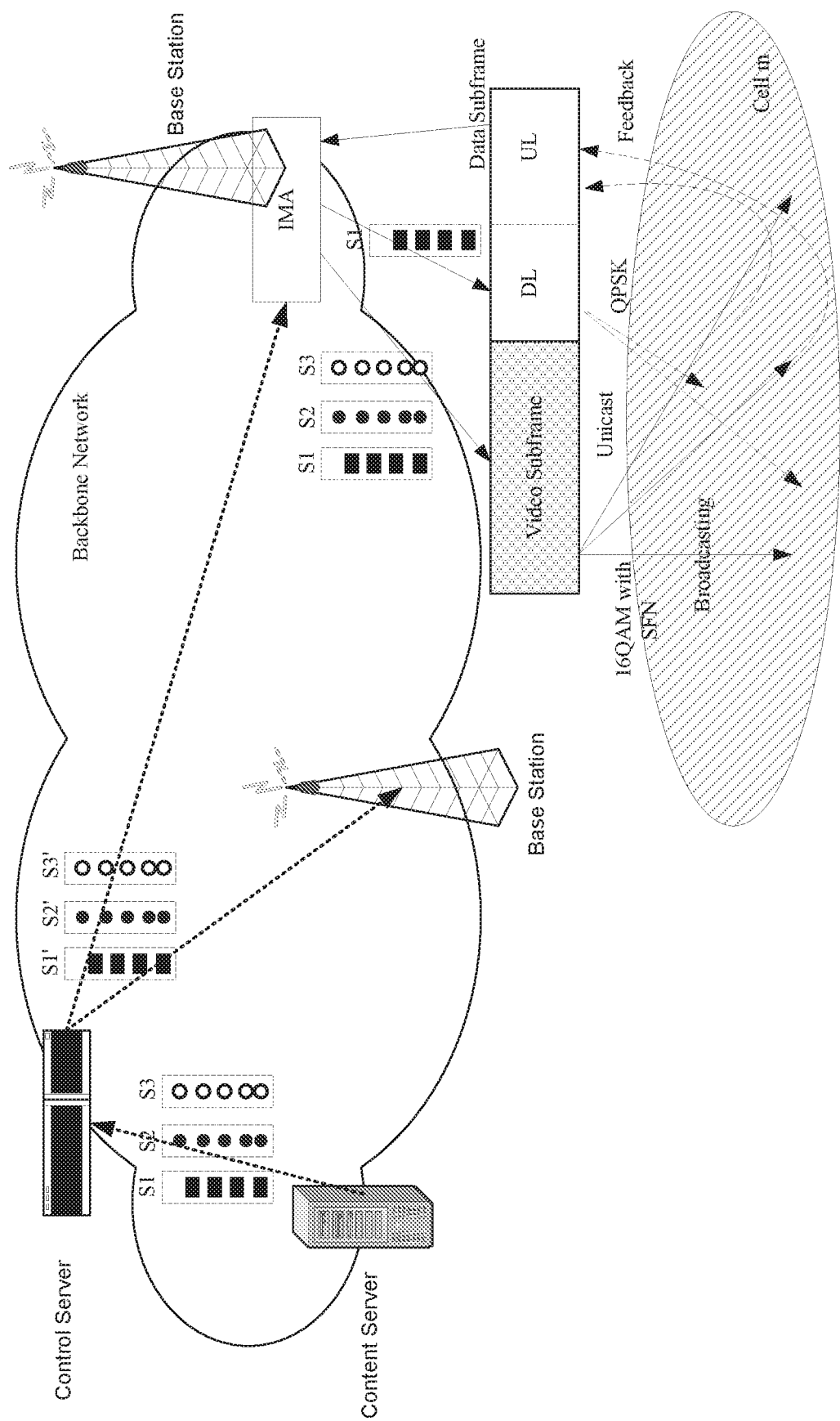
FIG. 7 illustrates an example of an intelligent bit stream scheduling for AFS.

In another embodiment, all the IMA system components are integrated with the base station in an AFS Cellular System. As illustrated in FIG. 7, S1, S2 and S3 are generated by the content server and transmitted to the control servers first. The control servers insert time synchronization tags into the streams and then forward them to the base stations via the backbone network. The time synchronization tags are used to indicate transmission time for all the base stations in SFN operation. The modified S1, S2 and S3 streams are marked as S1', S2', and S3'.

The adaptable frame structure has a video subframe which performs 16 QAM with SFN. The tags in the streams are removed by the base stations and the original S1, S2 and S3 are broadcasted simultaneously. The IMA in each base station buffers the S1 in its application bit stream queue. For a user who cannot decode the video subframe correctly, the base station will establish a downlink regular channel to the user based on the user's request and a channel quality report. The regular channel is defined in the AFS data subframe using QPSK modulation.

Application Bit Stream Queues

The application bit streams generated by the content server are first stored in the queues of the IMA. However, queuing may not be necessary for some applications. In one embodiment, the video broadcast application bit stream is mapped into broadcast channel directly. In another embodiment, the application bit stream remains in the queue for reliable data transmission until acknowledgements from all receivers come back.

Feedback Collector

In a wireless system with a feedback channel on the reverse link direction, the Feedback Collector collects all the feedback information and relays them to the Decision Making Database. Feedback information is part of the control information the Scheduler will use to make optimal scheduling decisions.

Decision Making Database

A scheduling decision is made by the IMA agent based on the information from the Decision Making Database and the scheduling algorithm. The information stored in the Decision Making Database include:

1. Application Information: An application may have its own distinctive requirements and preferences regarding channel scheduling decisions. In one embodiment, the original bit stream of a reliable broadcast data application is transmitted via the downlink broadcast channel with the retransmission stream scheduled into the regular channel.
2. Wireless Channel Information: The wireless channel information is important to the decision making process. The IMA needs to be aware of the wireless channel characteristics such as the signal quality, frequency, latency, etc.
3. Feedback Information: System augments can be based on the feedback information transmitted by the individual mobile station in its uplink channel. Examples are the receiver request, the ACK/NACK for each downlink data packet, and/or the downlink signal quality information.
4. Network Management Information: The network management system may impose an administration rule on the scheduling decision. In one embodiment, the users are classified by their terminal devices. Those using cell phones and PDAs can only receive low resolution basic video stream. While others using fixed terminals can additionally receive the complementary video stream to play back high resolution video. In another embodiment, the users are configured by their subscription types. The basic video stream is broadcasted via the downlink broadcast channel to mobile TV subscribers. SFN may be used in the downlink broadcast channel. The complementary video stream is transmitted in the downlink regular channel to those subscribed for high resolution TVs. Beam forming may be used to enhance the receiving quality for the HDTV subscribers.

In accordance with the embodiments of this invention, the IMA, either jointly or individually, applies relevant tables in the database to make scheduling decisions.

Since the environment of the system is changing, the information stored in the Decision Making Database is updated, sometimes frequently, to reflect the changes. Some information is derived locally from other systems. In one embodiment, when an application stops, the application information table is updated. Some information, such as the channel quality feedback and the receiver request, is fed back from the receivers through the uplink channel.

Scheduler

The Scheduler tries to make optimal scheduling decisions to achieve certain system objectives. It consults the Decision Making Database and uses its data as the input to the scheduling algorithm. First, the scheduler decides if the broadcast channel and the regular channel should be used for the data transmission. If both channels are used, the incoming data is dispatched into different channel message queues. Then the scheduler determines the MCS and transmission technologies used for the channels and allocates the air link resource to both channels. Finally, the data is mapped into the underlying physical channels and transmitted to the mobile stations after the physical layer finishes coding and modulation.

Transmission Mapping Engine

The scheduling decisions are forwarded to the Transmission Mapping Engine, which is in charge of retrieving the application bit stream and putting it into the correspondent wireless channel.

Methods for Cellular Broadcasting and Communication System

The mobile terminals measure the downlink signal quality for both the downlink broadcast channel and the downlink regular channel.

In one embodiment, in an AFS Cellular System, the broadcast channel and the regular channel occupy different subframes. Their signal quality can be measured in a time sharing fashion by the mobile terminal using the same radio frequency (RF) receiver circuitry.

In another embodiment, in a multiple frequency band AFS Cellular System, using subframe configuration 1 shown in FIG. 4, the broadcast channel and the regular channel are separated by different transmission times. The mobile terminal can still use the same RF receiver circuitry to measure the signal quality using time sharing.

In yet another embodiment wherein configuration 2 of FIG. 4 is used in a multiple frequency band AFS Cellular System, the broadcast channel and the regular channel are both used to transmit data at the same time. In this case, the mobile terminal uses two RF receiver circuitries to measure the signal.

The base station allocates the uplink channel resource to the mobile terminals, such as time/symbol and frequency/subchannel, for sending the measurement reports.

In one embodiment, the base station defines channel quality index (CQI) feedback regions for both the downlink broadcast channel and the downlink regular channel. The AFS CQI feedback regions are specified in the uplink channel by their subframe number, symbol index range, and subchannel index range.

By using the uplink channel, the base station can collect both the downlink broadcast channel and the downlink regular channel quality information from the mobile stations. The quality report can be updated by the mobile stations periodically. The mobile stations can also be polled by the base station or be triggered to send their reports by a predefined system event or threshold.

In one embodiment, with the real-time channel quality information, the MCS of the downlink broadcast channel is updated accordingly, which can override the default MCS derived from the pre-deployment site survey result.

The two types of downlink channels in the Cellular System have different characteristics. The MCS of the downlink regular channel is selected by the Medium Access Control (MAC) based on the received signal quality of the individual user. Most of the time the MCS of the broadcast channel is determined by general statistics of the wireless system, possibly obtained through pre-deployment site survey or cellular network planning.

When SFN is used, the broadcast channels of the neighboring base stations are coordinated to transmit simultaneously. However, the regular channel is always defined in a single cell. Additionally, advanced antenna transmission technology, such as beam forming, can be utilized in a regular channel to improve the SNR for a particular user.

Because of the differences of the channel characteristics, the choice of the scheduling method for a particular bit stream and for a specific radio channel will directly impact the system behavior, such as the system capacity. For example, the system bandwidth to transmit the same N bits of data to M users using the regular channel with 16 QAM is $N*M/4$ Hz. However, using QPSK in the downlink broadcast channel will take the system bandwidth up to $N/2$ Hz. Therefore, the broadcast channel is more bandwidth efficient if $M>2$.

Special arrangements can be made for selected individual mobile stations to improve the overall coverage. In one embodiment, the mobile station caches the broadcast data from the content server in the downlink broadcast channel. When it detects a missing packet, it will send to the base station a NACK control message via the uplink channel. The base station then retransmits the missing packet via the regular channel using the MCS according to the fed back downlink signal quality of the mobile station.

System augments can also be made based on the feedback information transmitted by the individual mobile stations in their uplink channel. In another embodiment, a mobile station reports the downlink signal quality to the base station. The base station may determine that the reported SNR is insufficient for this particular mobile station whenever data is broadcasted via the downlink broadcast channel in the SFN. In such a case, the base station will adjust MCS, the MAC resource allocation (time, frequency, subchannels), and power, etc. to send the signal to the mobile station in the regular channel. The base station can also use beam forming to improve the downlink signal quality for the user. The transmission parameters are specifically selected for that user, based on the feedback.

In yet another embodiment, the SFN enabled broadcast channel is used to transmit SDTV program (S1+S2) using hierarchy modulation scheme. If a user experiences difficulties decoding S1 from the broadcast channel, it sends a feedback signal via the uplink regular channel. The feedback contains the channel quality report and the user request. Upon receiving the feedback report, the serving base station starts to forward S1 to the user through a downlink regular channel, with or without beam forming. In another embodiment, if a user wishes to receive an HDTV signal, it sends a request along with a feedback report with the channel signal quality to the serving base station. A downlink regular channel is used to transmit S3 to the user after the base station validates the request.

Hierarchy modulation may also be used to transmit bit streams in a wireless communication system. Table 1 illustrates an example of the scheduling between the hierarchical bit streams and its correspondent modulation schemes for HDTV broadcast using multiple bit streams.

TABLE 1

Scheduling between hierarchy modulation schemes and multiple application bit streams

| Hierarchy Modulation Schemes | Multiple Application Bit Streams |
|---|---|
| 64 QAM | HDTV quality broadcast (S1 + S2 + S3) |
| 16 QAM | SDTV (S1 + S2) |
| QPSK | Mobile TV (S1) |

Methods and apparatus are also provided for synchronized data distribution in a packet data network. Simultaneous broadcasting of the same content by the base stations, using the same time/frequency resource, allows the receivers to combine the received signals from different base stations and improve their reception quality. As mentioned above, in each multi-cell wireless deployment, there is at least one control server (CS) that controls one or multiple base stations (BS). The control server is connected to the base stations via the backbone network. In the presented embodiments, the backbone network is a packet data network that can either be a wired or a wireless network. Without loss of generality, IPv4 is used to illustrate these embodiments.

The wireless system described herein is associated with a certain transmission format. The frame duration and its structure can be described by a mathematical function of time. All the base stations are aligned in transmission time at the frame boundary. The sequence of the frame and its relationship to the time is known to all the BSs and CSs.

Figure 8:
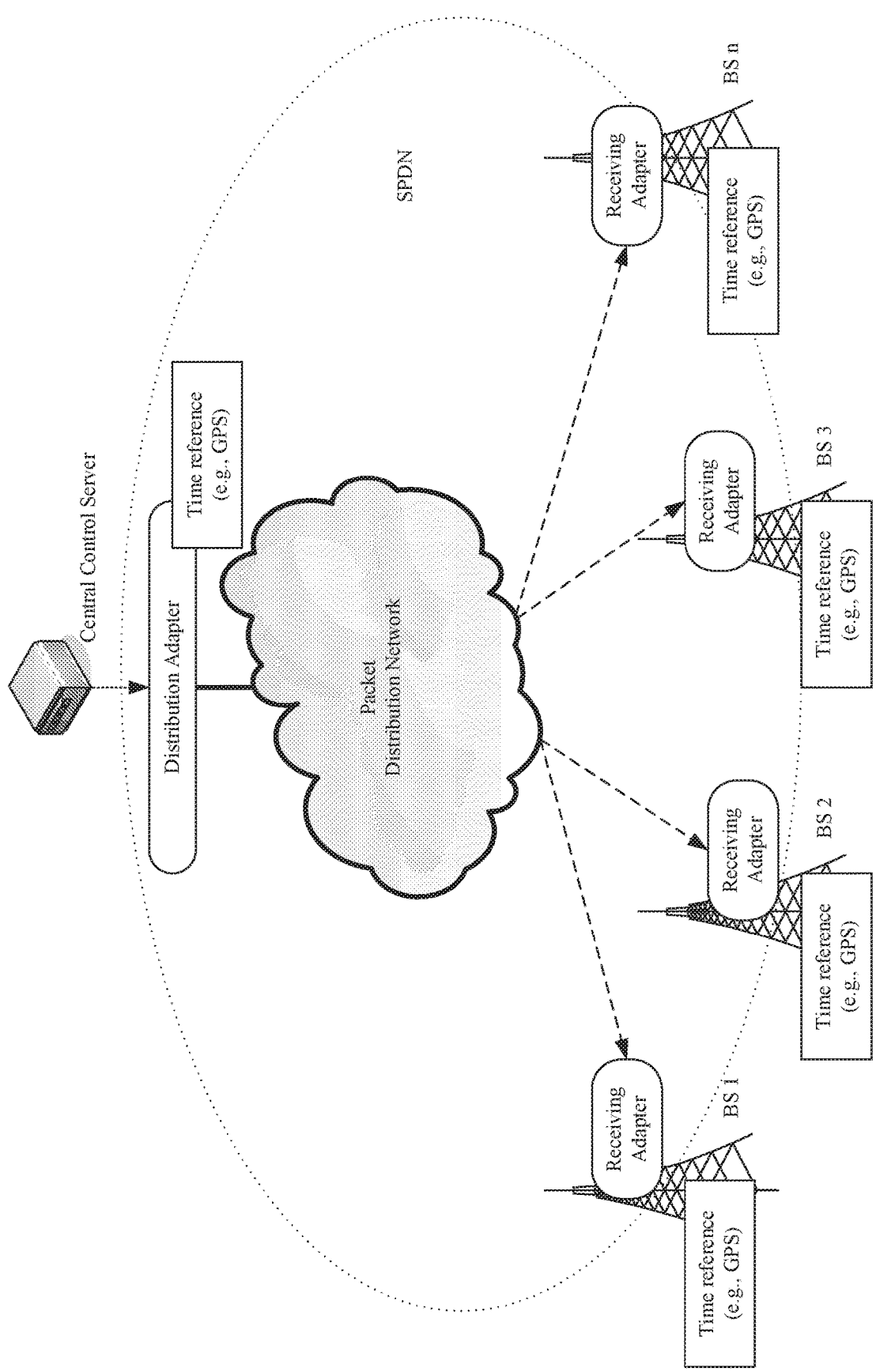
FIG. 8 illustrates a basic architecture of a synchronized packet distribution network (SPDN).

FIG. 8 illustrates a basic architecture of a synchronized packet distribution network (SPDN). The SPDN has a Distribution Adapter (DA) which receives original application data packets and, after adding the additional protocol information, distributes them across the packet distribution network (PDN) to the base stations. The additional protocol information added by the DA includes time synchronization information, resource scheduling information, and protocol control information. The inputs to the DA are original data packets, whereas the outputs from the DA are distribution data packets.

In each base station, a device called the Receiving Adapter (RA) ensures simultaneous data transmission among the base stations by using the same data content and the same time/frequency resource. The RA will retrieve the time synchronization information in the distribution data packet and use it to control the start time of data transmission. All the packets will be buffered and sorted to re-establish the delivery sequence before they are broadcasted over the air. A synchronization distribution protocol is defined for the SPDN. Both the RA and the DA may synchronize with the same time reference, such as the global position system (GPS) signals.

The SPDN distribution network protocol is carried out on top of the underlying data network protocol. The distribution network protocol is transparent to the underlying data network devices. Segmentation and reassembly may be necessary at the DA and the RA at each base station.

SFN in Cellular Broadcasting and Communication System

In wireless applications such as digital video broadcasting, SFN technology is used to alleviate the problem of interference between base stations. Even if OFDM is used in the system, simultaneous transmission of the same broadcasting content by the base stations, using the same time/frequency resource, allows a receiver to combine the receiving signals from different base stations and boost its SNR. The underlying wireless system is associated with a certain transmission format. All the base stations are aligned in transmission time at the frame boundary. The sequence of the frame is known to all the BSs and CSs via a synchronization distribution mechanism.

In one embodiment, the base stations are synchronized with each other for transmission. Furthermore, the system frame structure is defined by a distributed frame number synchronization mechanism while a common frame number scheme is shared between the CS and BSs. The common frame number is increased every frame by both the CS and the BSs. The distributed frame number synchronization mechanism makes sure the frame number is always in sync within the network.

The same mechanism can be used to derive common super-frame and subframe numbers as long as the frame structure is predefined in the system with some mathematical relationship between the numbers. For example, if each frame has 4 subframes, the subframe number can be expressed by 4N+M, where N is the common frame number and M is the sequence number of a subframe within the frame.

In another embodiment when adaptable frame structure (AFS) is used in a TDD wireless system, each TDD frame has multiple subframes. Each subframe, as shown in FIG. 3, can be designed to fit a special application, such as voice, data, or video. A frame is divided into multiple subframes with flexible mix of subframe types. The frame structure is known to both CS and BSs, and all the BSs are synchronized and align their transmission along the subframe boundary. A common subframe number scheme is maintained in the system. Furthermore, the CS knows the exact video subframe capacity derived from the predefined coding/modulation scheme for the video subframe. The video payload length of each video subframe can be calculated by subtracting the overhead bits from the overall subframe capacity.

The CS and the BSs are connected by a packet data network (PDN). The PDN is designed with the maximum PDN transmission delay known to both CS and BS. In a packet data network, information is transmitted in a data packet with source and destination addresses in the header. The disclosed embodiments do not impose any restriction on the network protocol or transmission technologies used in the packet data networks, such as Ethernet, Internet Protocol version 4 (IPv4), IPv6, and ATM. Therefore, without loss of generality, IPv4 is employed herein to illustrate the operations of these embodiments.

The SPDN, with its two system components DA and RA, is built on top of the underlying packet data network that connects the CS and the BSs. DA is located in the network and is in charge of producing the distribution network packets with additional protocol control information. RA is located in the base station. It first retrieves the time synchronization information from the distribution data packet and then delivers the original data to the BS at the exact frame based on the time synchronization information.

The distribution data packets must arrive at the RA before the transmission start time specified in the packet. The DA has to take into account the maximum PDN transmission delay when calculating the time control information for the distribution data packet. Distribution data packets are buffered at the RA before they are sent to the BS for broadcasting at the exact time.

SPDN Architecture

The architecture of the SPDN and the description of some of its components are presented below. While specific embodiments and examples are hereby described for illustrative purposes, various equivalent modifications are possible within the scope of the invention. Some aspects of these embodiments can be applied to other systems. Also, the elements and acts of the various embodiments described here can be combined to provide further embodiments.

Distribution Adapter

The DA receives original data packets and distributes them across SPDN to the RAs in the base stations. Distribution takes place after adding the supplementary protocol information using the synchronization distribution protocol. Therefore, the input to the DA is the original data packets and the output to the DA is the distribution data packets.

The DA may distribute original data packets from multiple application data sources. For example, in IPTV applications, each TV channel is an application data source that generates its own data packets. Hence, the DA may need to be aware of the application data source.

On the other hand, the SPDN may have multiple DAs; each of them taking care of the original data packets from one or multiple application data sources. In such a case, the DAs may need to coordinate with each other. The typical protocol information added by the DA can include:

1. Time synchronization information, wherein DA determines the start time of the data transmission for the base stations. Such start time is part of the time synchronization information. The maximum PDN transmission delay also needs to be considered. Since the data and the time information has to arrive at the RA in advance, the start time must refer to some future time value that is greater than the maximum PDN transmission delay. For example, if the maximum PDN transmission delay is 500 ms, the start time of data transmission has to be a time sufficiently longer than 500 ms, such that when the start time is received and decoded at the RA, it still refers to a time in the future for transmission. If it indicates a time that has already passed, the base station RA shall disregard the data and may generate an error report. In one embodiment for AFS system, the time synchronization information is expressed by the video subframe number. The DA notifies the RA of the exact video subframe for video broadcasting, using the associated distribution data packets.
2. Resource scheduling information, wherein the DA may also determine what air link resource should be used for the data transmission, in which case the Medium Access Control (MAC) scheduling function is carried out by the DA. In one embodiment, the AFS subframe number is used as an indicator of the air link resource. Given a particular video data packet, the DA specifies the video subframe number for it to be transmitted by all the base stations. In another embodiment, the DA assembles video data packets into one distribution data packet, which fits into an AFS video subframe. Then the new distribution data packet is sent to the base stations with the corresponding video subframe number as transmission time reference.
3. Application specific control information, where in addition to the air link resource scheduling information, the DA may also include other application specific control information that helps improve system performance. For example, power saving is critical for battery operated terminals in the system. If there is no data to receive, a terminal will stay in the power saving mode and wakes up periodically to check for the new data. If there is no pending data, the terminal goes back to the power saving mode. In one embodiment, the DA does the resource allocation and also announces the next scheduled SFN transmission time. The terminal in the power saving mode only wakes up in time before the scheduled video subframe and starts receiving its data. It reduces the unnecessary wake up times and therefore further reduces the power consumption. In another embodiment where BS is in control of the MAC scheduling, it broadcasts the transmission prediction information within the cell.
4. Protocol control information, wherein the packet delivery sequential order may be lost in the data network. To make sure every base station transmits the data in a correct sequential order, some protocol control information such as the packet sequence number is needed.

The SPDN protocol guarantees the in-order distribution data packet delivery. SPDN may also verify the distribution data packet integrity by adding redundant error detection protocol control information. In one embodiment, a new cyclic redundancy check (CRC) is added to the distribution data packet. In another embodiment, the error detection code of the original data packet is recalculated to protect the whole new distribution data packet.

The DA can insert the additional protocol information in the beginning, in the middle, or at the end of the original data packet. Packet-specific information, such as the packet sequence and time synchronization information, is inserted into every data packet. The information common to multiple packets, such as the resource indication for several data packets, is only inserted once every N packet, where N is greater than or equal to one.

Distribution Network Protocol

The distribution network protocol defines rules for distribution data packets delivery to the base stations. The protocol is built on top of the underlying data network protocol. Without loss of generality, IPv4 is used to illustrate the design of the distribution network protocol.

Distribution Data Packet Format

A distribution data packet is formed by inserting the additional/supplementary protocol information to an original data packet. The additional protocol information is inserted in the beginning, in the middle, or at the end of the original data packet. Without loss of generality, in some embodiments, the distribution protocol header contains all the additional protocol information. It may also contain the source and destination addresses of the distribution protocol.

Figure 9:
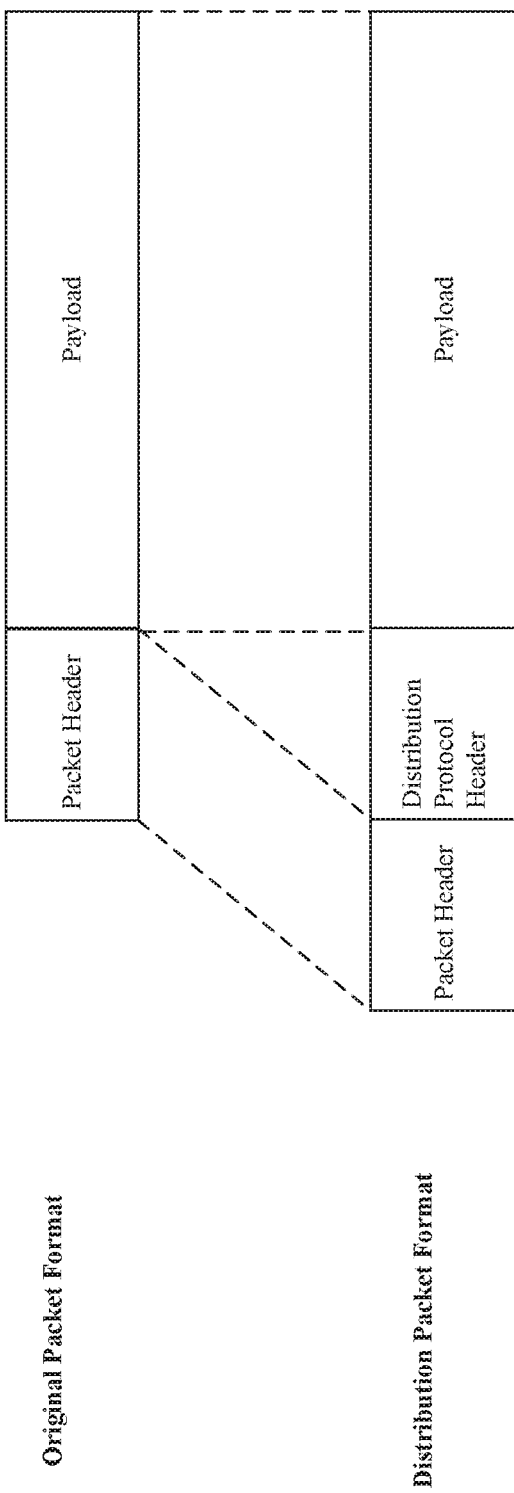
FIG. 9 is an example of a distribution data packet format.

In one embodiment, the distribution protocol header is inserted between the original data packet header and the original data packet payload. In this embodiment, the source and destination addresses of the original data packet remain unchanged and the SPDN relies on the underlying routing protocol to distribute the distribution data packet. The original data packet checksum is recalculated to reflect the change of packet payload. FIG. 9 shows the format of a distribution data packet.

In another embodiment, encapsulation is used to generate the distribution data packet. A new distribution protocol header is added at the beginning of the original data packet. The header contains the additional protocol information for the base station RA to recover time synchronization information, such as the frame number index for data broadcasting by all the base stations. A CRC is also appended at the end of the distribution packet, as illustrated in FIG. 10.

Figure 10:
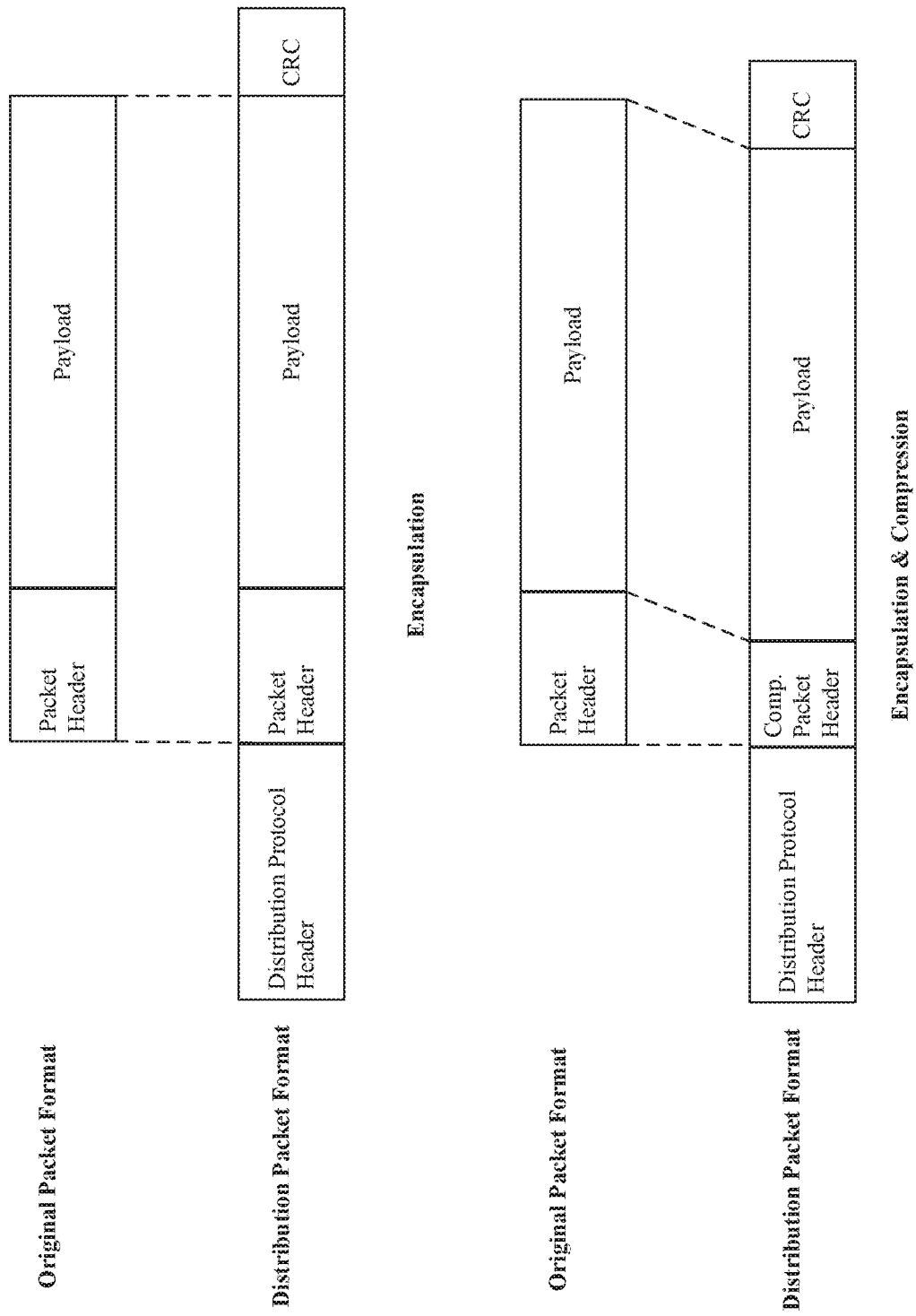
FIG. 10 is another example of the distribution data packet format.

FIG. 10 also illustrates another embodiment of distribution data packet format. In order to reduce the encapsulation overhead, the DA uses a header compression algorithm for the original data packet. At the RA, the original data packet will be restored by taking out the distribution protocol header and decompressing the original data packet header.

Figure 11:
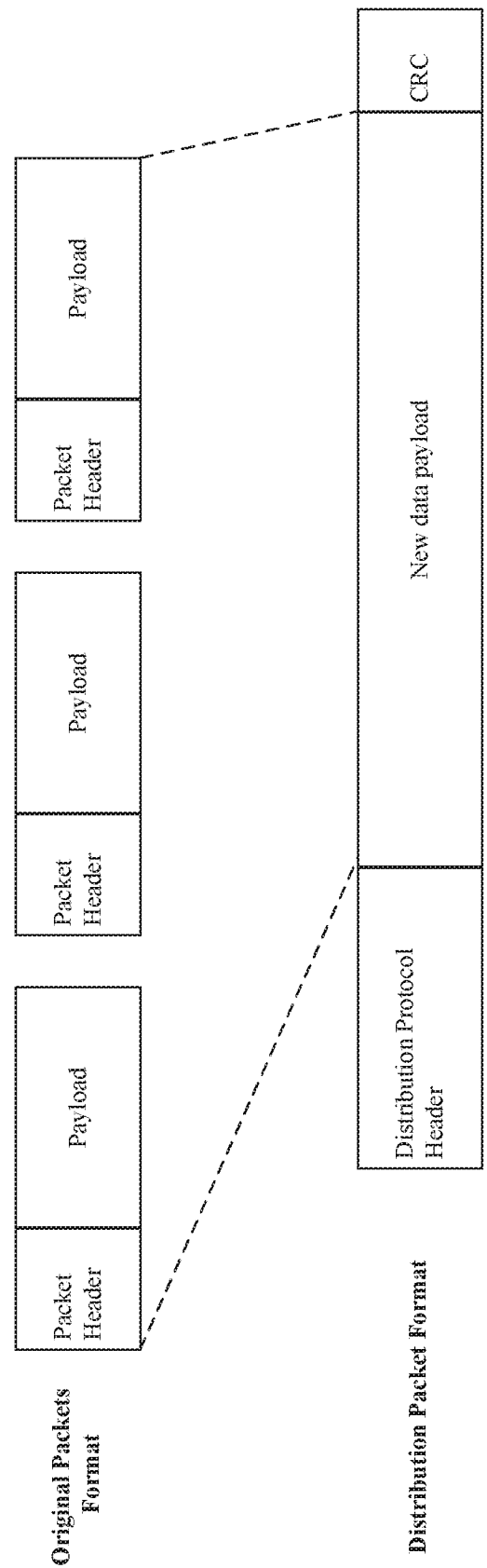
FIG. 11 is yet another example of the distribution data packet format.

In yet another embodiment, the DA, based on the knowledge of the exact air-link resources for data broadcasting, assembles multiple original data packets together in the new distribution data packet. The distribution data packet payload fits in the broadcasting air link resources. A new protocol header is constructed to carry the additional protocol information together with the source and destination addresses. The new CRC is also generated and appended, as shown in FIG. 11. Once the RA receives the distribution data packet, it forwards the payload to the base station at the time indicated by the time synchronization information in the distribution protocol header.

Figure 12:
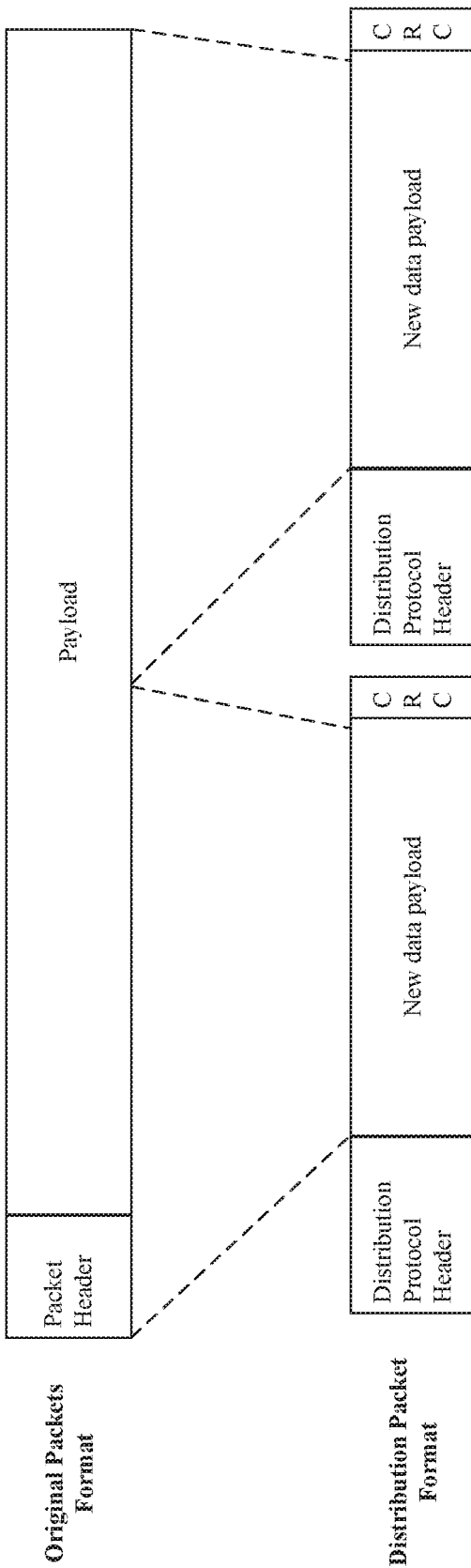
FIG. 12 illustrates a distribution data packet format.

In another embodiment, the DA segments the original data packet into several pieces and transmits them across PDN with the distribution protocol header. At the base station RA, they will be reassembled together. FIG. 12 shows the format of such a distribution data packet.

Packet Transmission

The distribution network protocol is implemented on top of the underlying data network protocol. The protocol runs between the DA and the RA in the base stations. Only the end systems, namely the DA and the RA, are aware of the protocol. It is transparent to the underlying data network devices, such as routers in an IP data network.

The packet transmission is based on the multicast technology. If the underlying network architecture does not support multicast, such as PPP (point to point protocol), the multicasting function is simulated by transmission of duplicated distribution packets over multiple unicast network links.

In one embodiment, the DA segments the original data packet to fit into the maximum transfer unit (MTU) of the underlying data network protocol and the RA reassembles the original data packet from its fragments.

The distribution network protocol may also try to achieve reliable data transmission on top of the underlying network protocol, implying that a retransmission based on the acknowledgement may be necessary. In another embodiment, the reliable multicast techniques are used in the distribution network protocol. For example, the RA reports to the DA about any packet loss, based on the protocol control information such as checksum and sequence number. The DA will then retransmit the requested distribution packet.

Receiving Adapter

The RA in a base station ensures that the synchronized data transmission among all base stations carries the same data content, with the same time/frequency resource, and at the same time. When a distribution data packet arrives at the base station, the RA will retrieve the necessary information needed for transmission over the air link. Since the underlying packet data network may alter the packet arrival order, the RA needs to buffer the distribution data packets and restore the delivery sequential order based on the protocol control information in the distribution protocol header. It may also reassemble the original data packets if segmentation is performed at the DA. Similarly, when header compression is performed at the DA to the original data packet header, the RA is responsible for restoring the original packet header by decompression.

In case the RA is not able to recover all the distribution packets due to errors, it activates the error protection mechanism to avoid the interference with the transmission by base stations. For example, a base station must not transmit a distribution data packet if its transmission time has already passed when it arrives at the base station. Instead, the base station discards the overdue packet and remains silent for the duration of the transmission period for the overdue packet.

Design Illustration

In this section, an illustration is provided to understand the design of SPDN. Without loss of generosity an AFS TDD wireless system is employed. The multi-cell deployment has one CS and multiple BSs. They are connected with IPv4 packet data network with the assumed maximum PDN transmission delay of 500 ms. IP multicast is supported for data transmission between CS and BSs. All the BSs are aligned in their transmission time at the TDD frame boundary. The frame duration is 10-ms long and each frame consists of 4 subframes. The subframe duration is 2.5 ms. A synchronization mechanism for the distributed frame number is in place so that the CS and BSs share a common frame number and, based on it, a common subframe number is derived. Based on the video subframe duration, the usable data bandwidth of the subframe, and the predefined coding/modulation scheme (QPSK with ½ rate coding) the CS calculates that N bytes of data can be transmitted in a video subframe.

In one embodiment, the DA, with the knowledge of the video subframe capacity of N bytes, assembles the incoming video packets into a distribution data packet with data payload length of N. When the RA receives such a distribution data packet, forwards its data payload to the physical layer directly at the broadcasting subframe, which should fit exactly into the resource after coding and modulation. The distribution data packet header contains the starting subframe number for the SFN broadcast, which is generated base on the common subframe number scheme.

Since the maximum PDN transmission delay is 500 ms or equivalently 200-subframe long, the starting subframe number will not exceed 256 in a modular operation. Therefore, only 8 bits are needed to identify the starting subframe number within the SPDN. For example, when the current common subframe number is 0, the DA sends out a distribution packet and assigns to it the starting subframe number of 200. When the RA receives the distribution packet, because of the PDN transmission delay (e.g., 495 ms), the common subframe number has advanced from 0 to 198. The RA waits for 2 subframes so that the common subframe number is equal to the specified value 200 and forwards the data packet to the BS for transmission.

The subframe number is based on a modular 256 calculation in the example. If the distribution data packet length is larger than the MTU of the PDN, the DA further segments the packet into several transmission packets. The distribution data packet header contains an 8 bits common subframe index. In this case, segment information is also included in each transmission data packet.

Figure 13:
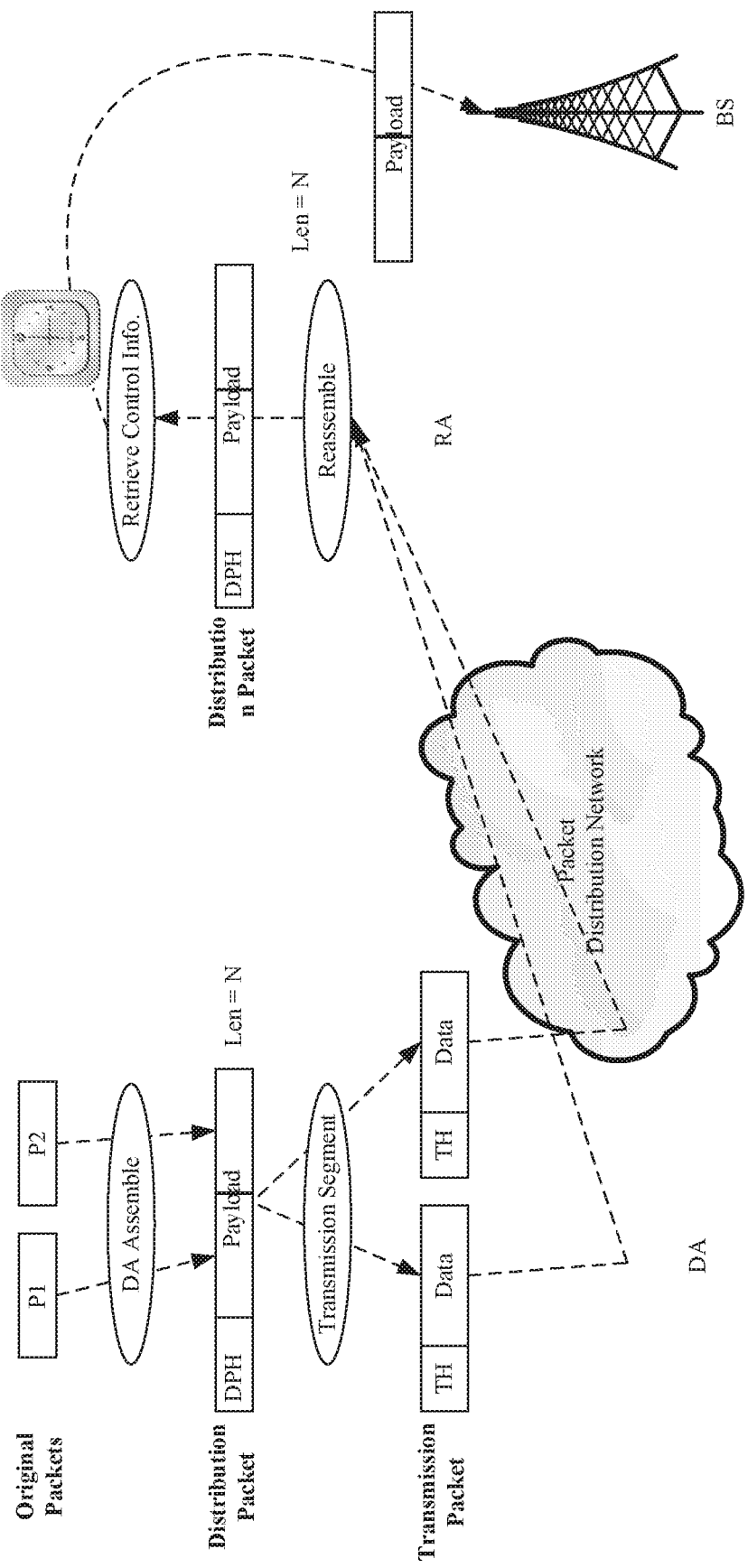
FIG. 13 illustrates DA and RA processes.

Across the PDN, on the RA side, the RA first assembles the distribution data packet from multiple transmission data packets. It then retrieves the subframe number information in the distribution data packet header. Since the RA shares the same common subframe number with the BS, it forwards the N byte data payload to the BS at the correspondent video subframe. FIG. 13 illustrates this process.

In another embodiment, instead of assembling the incoming video packets, the DA adds the necessary information to an individual video packet, as it arrives at the DA, and then sends it out as a distribution data packet. Since multiple video packets can fit into one video subframe, the DA needs to indicate their sequential order to the RA. Therefore, the distribution data packet header must contain the common subframe number and the packet sequence number. If one video subframe can transmit maximum 16 video packets, then 4 bits are needed in the header to identify the sequence number. In addition, the DA also includes one bit in the header to indicate the last distribution data packet to be transmitted in the subframe.

When the RA receives the distribution data packet, it sorts the data based on the subframe number and the packet sequence. If the last distribution data packet of the video subframe is received, it assembles them into N bytes payload for the video subframe and pads the unfilled bytes with a predefined byte pattern, such as 0x00. The RA then forwards the N bytes payload to the BS at the correspondent video subframe.

The subframe can be further divided into multiple video broadcast slots. In this case, the common subframe number does not have enough resolution to identify the resource. If the slot configuration is known to both the CS and the BSs, the DA can provide the video slot number in the distribution data packet header to identify it.

Furthermore, the video broadcast slot can be dynamically allocated by the CS based on the properties of the video program. In this case, the slot can be identified by its construction subchannel numbers. The DA should indicate these numbers to the RA as well. For efficiency reasons, the subchannel numbers may be expressed using compression format. In one embodiment, all the subchannels in a video slot are consecutive. The DA only indicates the start subchannel number and the total number of subchannels in the video slot. In another embodiment, the subchannels are distributed. The DA uses bitmap to express their distribution patterns.

For the described embodiments, the distributed frame number synchronization mechanism is at the core of the SFN operation. The mechanism sets up a synchronized mapping function between the time and the common frame number. It can be developed based on the same time reference known to all the base stations and the CSs.

In one embodiment, the global positioning system (GPS) is used as the common time reference. A GPS receiver is integrated with each BS or CS. The GPS receiver generates a pulse periodically (e.g., every second). Since the AFS frame structure has a 2.5 ms subframe, every second 400 subframes are transmitted. In order to establish a common subframe number within the network, each BS or CS will track its own subframe counter in the following manner:

1. The counter is stored as an internal variable in the device memory.
2. For every subframe, the counter is incremented by 1.
3. At the time when the GPS pulse arrives, it is reset to 0.

Since the BSs and CSs are all synchronized by the GPS signal, their counters remain aligned.

The maximum PDN transmission delay is also known to BSs and CSs. In one embodiment, the value is measured during the pre-deployment network design and is stored in CSs and BSs during its initial configuration. The quality of service mechanism in the PDN ensures that the actual PDN transmission delay is always less than the maximum delay. However, if the maximum PDN transmission delay is changed when the PDN infrastructure updates, the new latency value needs to be updated for all the CSs and BSs accordingly.

In another embodiment, the maximum value is transmitted together with the distribution packet as part of the time synchronization information. In this way, each packet can have a different maximum delay value, which provides an update mechanism when the maximum PDN transmission delay changes.

The following description provides specific details for a thorough understanding of the various embodiments and for the enablement of one skilled in the art. However, one skilled in the art will understand that the invention may be practiced without such details. In some instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number in this Detailed Description section also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method performed by a mobile device in an orthogonal frequency division multiple access (OFDMA) system, the method comprising: receiving, in a first radio-frequency (RF) band, first scheduling information from a serving base station, the first scheduling information indicating an allocation of airlink resources in the first RF band, wherein the first RF band spans a first plurality of subchannels; receiving, in a second radio-frequency (RF) band, second scheduling information from the serving base station, the second scheduling information indicating an allocation of airlink resources in the second RF band, wherein the second RF band spans a second plurality of subchannels, wherein the first RF band and second RF band are different RF bands; and receiving a first signal on the allocated airlink resources in the first RF band and a second signal on the allocated airlink resources in the second RF band during a common time period, each of the first signal and second signal carrying data, wherein a same type of frame structure is used for receiving the first signal and the second signal, wherein the same type of frame structure spans a plurality of subframes.

2. The method of claim 1, further comprising: receiving third scheduling information indicating an allocation of airlink resources in the first RF band; and transmitting a third signal to the base station, on the airlink resources in the first band;
receiving fourth scheduling information indicating an allocation of airlink resources in the second RF band; and transmitting a fourth signal to the base station, on the airlink resources in the second band; wherein acknowledgement information is transmitted on a single uplink band.

3. The method of claim 1, further comprising: entering a low power mode; returning from the low power mode to receive third scheduling information on one of the first RF band or the second RF band; and determining whether to return to the low power mode, based on the third scheduling information indicating whether data is scheduled for the mobile device.

4. The method of claim 1, further comprising: measuring a downlink signal quality of the first RF band; measuring a downlink signal quality of the second RF band; reporting the downlink signal quality measurement of the first RF band on airlink resources of the first band; and reporting the downlink signal quality measurement of the second RF band on airlink resources of the second band.

5. The method of claim 4, further comprising: receiving an indication of a first modulation and coding scheme (MCS), based on the downlink signal quality measurement of the first RF band, wherein the first MCS is one of 16QAM or QPSK.

6. The method of claim 1, wherein the same type of frame structure includes a first portion dedicated to scheduling information and a subsequent portion dedicated to data.

7. A mobile device configured for operation in an orthogonal frequency division multiple access (OFDMA) system, the mobile device comprising: a receiver configured to receive, in a first radio-frequency (RF) band, first scheduling information from a serving base station, the first scheduling information indicating an allocation of airlink resources in the first RF band, wherein the first RF band spans a first plurality of subchannels; the receiver configured to receive, in a second radio-frequency (RE) band, second scheduling information from the serving base station, the second scheduling information indicating an allocation of airlink resources in the second RF band, wherein the second RF band spans a second plurality of subchannels, wherein the first RF band and second RF band are different RF bands; and the receiver configured to receive a first signal on the allocated airlink resources in the first RF band and a second signal on the allocated airlink resources in the second RF band during a common time period, each of the first signal and second signal carrying data, wherein a same type of frame structure is used for receiving the first signal and the second signal, wherein the same type of frame structure spans a plurality of subframes.

8. The mobile device of claim 7, further comprising: the receiver configured to receive third scheduling information indicating an allocation of airlink resources in the first RF band; and a transmitter configured to transmit a third signal to the base station, on the airlink resources in the first band; the receiver configured to receive fourth scheduling information indicating an allocation of airlink resources in the second RF band; and the transmitter configured to transmit a fourth signal to the base station, on the airlink resources in the second band, wherein acknowledgement information is transmitted on a single uplink band.

9. The mobile device of claim 7, further comprising: circuitry configured to enter a low power mode; circuitry configured to return from the low power mode to receive third scheduling information on one of the first RF band or the second RF band; and circuitry configured to determine whether to return to the low power mode, based on the third scheduling information indicating whether data is scheduled for the mobile device.

10. The mobile device of claim 7, further comprising: circuitry configured to measure a downlink signal quality of the first RF band; circuitry configured to measure a downlink signal quality of the second RF band; a transmitter configured to report the downlink signal quality measurement of the first RF band on airlink resources of the first band; and a transmitter configured to report the downlink signal quality measurement of the second RF band on airlink resources of the second band.

11. The mobile device of claim 10, further comprising: the receiver configured to receive an indication of a first modulation and coding scheme (MCS), based on the downlink signal quality measurement of the first RF band, wherein the first MCS is one of 16QAM or QPSK.

12. The mobile device of claim 7, wherein the same type of frame structure includes a first portion dedicated to scheduling information and a subsequent portion dedicated to data.

13. A method performed by a base station in an orthogonal frequency division multiple access (OFDMA) system, the method comprising: transmitting, in a first radio-frequency (RF) band, first scheduling information to a mobile device, the first scheduling information indicating an allocation of airlink resources in the first RF band, wherein the First RF band spans a first plurality of subchannels; transmitting, in a second radio-frequency (RF) band, second scheduling information to the mobile device, the second scheduling information indicating an allocation of airlink resources in the second RF band, wherein the second RF band spans a second plurality of subchannels, wherein the First RF band and second RF band are different RF bands; and transmitting a first signal on the allocated airlink resources in the first RF band and a second signal on the allocated airlink resources in the second RF band during a common time period, each of the first signal and second signal carrying data, wherein a same type of frame structure is used for transmitting the first signal and the second signal, wherein the same type of frame structure spans a plurality of subframes.

14. The method of claim 13, further comprising: transmitting third scheduling information indicating an allocation of airlink resources in the first RF band; and receiving a third signal from the mobile device, on the airlink resources in the first band; transmitting fourth scheduling information indicating an allocation of airlink resources in the second RF band; and receiving a fourth signal from the mobile device, on the airlink resources in the second band.

15. The method of claim 13, wherein the first scheduling information indicates to the mobile device to return from a low power mode.

16. The method of claim 13, further comprising: receiving a report, from the mobile device, wherein the report indicates a downlink signal quality measurement of the first RF band, on airlink resources of the first band; and receiving a report, from the mobile device, wherein the report indicates a downlink signal quality measurement of the second RF band, on airlink resources of the second band.

17. The method of claim 16, further comprising: transmitting an indication of a first modulation and coding scheme (MCS), based on the downlink signal quality measurement of the first RF band, wherein the first MCS is one of 16QAM or QPSK.

18. The method of claim 13, wherein the same type of frame structure includes a first portion dedicated to scheduling information and a subsequent portion dedicated to data.

19. A base station configured for operation in an orthogonal frequency division multiple, access (OFDMA) system, the base station comprising: a transmitter configured to transmit, in a first radio-frequency (RF) band, first scheduling information to a mobile device, the first scheduling information indicating an allocation of airlink resources in the first RF band, wherein the first RF band spans a first plurality of subchannels; the transmitter configured to transmit, in a second radio-frequency (RF) band, second scheduling information to the mobile device, the second scheduling information indicating an allocation of airlink resources in the second RF band, wherein the second RF band spans a second plurality of subchannels, wherein the first RF band and second RF band are different RF bands; and the transmitter configured to transmit a first signal on the allocated airlink resources in the first RF band and a second signal on the allocated airlink resources in the second RF band during a common time period, each of the first signal and second signal carrying data, wherein a same type of frame structure is used for receiving the first signal and the second signal, wherein the same type of frame structure spans a plurality of subframes.

20. The base station of claim 19, further comprising: the transmitter configured to transmit third scheduling information indicating an allocation of airlink resources in the first RF band; and a receiver configured to receive a third signal from the mobile device, on the airlink resources in the first band; the transmitter configured to transmit fourth scheduling information indicating an allocation of airlink resources in the second RF band; and the receiver configured to receive a fourth signal from the mobile device, on the airlink resources in the second band.

21. The base station of claim 19, wherein the first scheduling information indicates to the mobile device to return from a low power mode.

22. The base station of claim 19, further comprising: a receiver configured to receive a report of a downlink signal quality measurement of the first RF band on airlink resources, of the first band; and a receiver configured to receive a report of a downlink signal quality measurement of the second RF band on airlink resources, of the second band.

23. The base station of claim 22, further comprising: the transmitter configured to transmit an indication of a first modulation and coding scheme (MCS), based on the downlink signal quality measurement of the first RF band, wherein the first MCS is one of 16QAM or QPSK.

24. The base station of claim 19, wherein the same type of frame structure includes a first portion dedicated to scheduling information and a subsequent portion dedicated to data.

\* \* \* \* \*